Patented Apr. 16, 1946

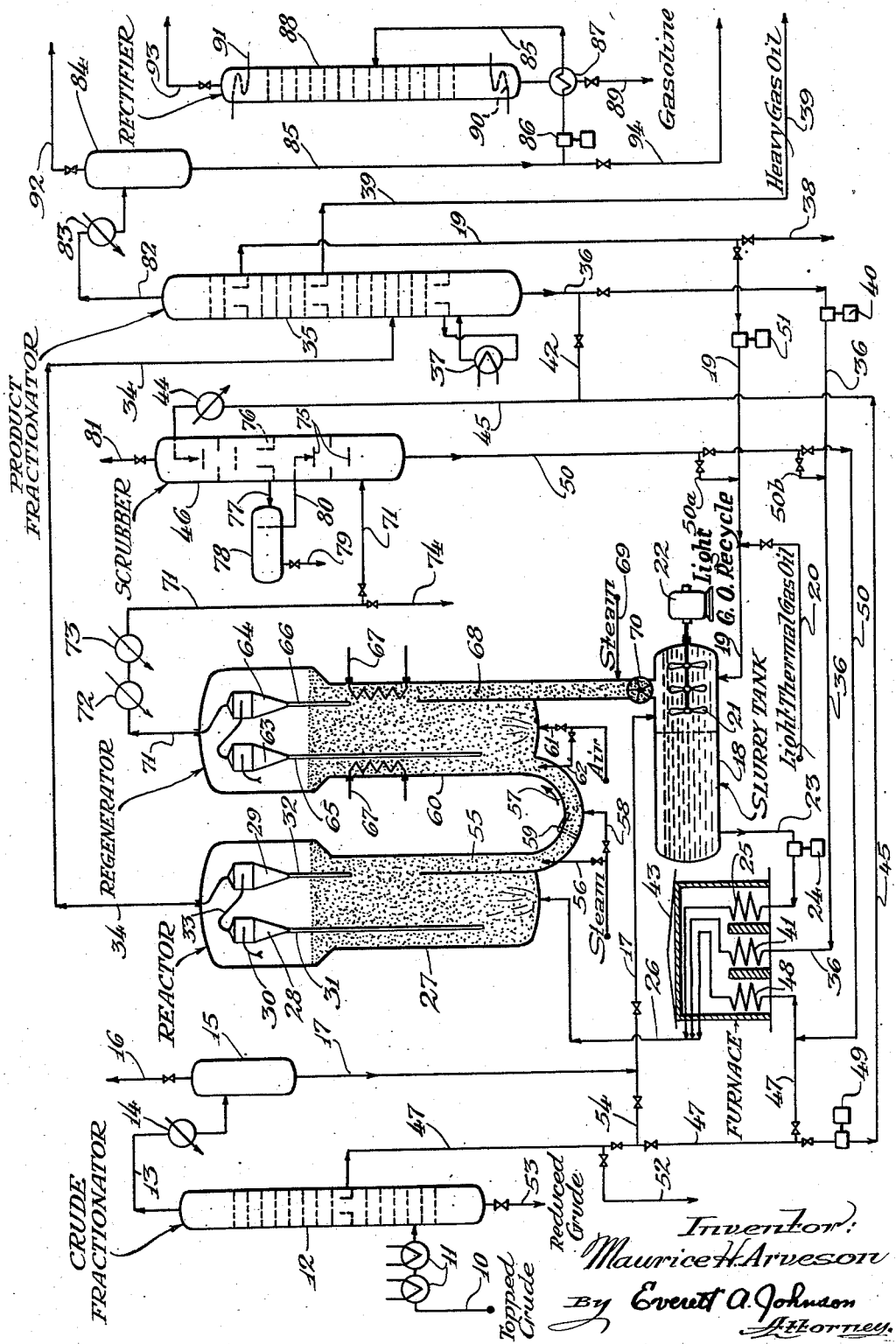

2,398,489

UNITED STATES PATENT OFFICE 2,398,489

CATALYTIC CONVERSION PROCESS

Maurice H. Arveson, Flossmoor, Ill., assignor to Standard Oil Company, Chicago, Ill., a corporation of Indiana Application November 24, 1941, Serial No. 420,204

3 Claims. (Cl. 196—52)

This invention relates to a catalytic conversion system and it pertains to a system for handling finely divided or powdered catalyst which is alternately used in conversion and regenerated. More particularly the invention relates to a catalytic conversion process wherein a powdered catalyst promotes a reaction while suspended in gases or vapors; the catalyst is separated from the reaction products and regenerated while suspended in a regeneration gas, is separated from the regeneration gas and is returned to the conversion step as a slurry with fresh and recycle feed.

One object of my invention is to provide a process wherein the spent catalyst is transferred in a dense aerated condition to the regeneration zone and the regenerated catalyst is transferred to the reaction zone in a slurry with the hydrocarbon feed to the reaction zone. A further object of my invention is to provide a conversion process having long catalyst residence time and low catalyst-to-oil feed ratio. Another object is to provide a process wherein the hydrocarbon oil is heated and vaporized in the presence of the powdered catalyst. These and other objects will become apparent as the description of my invention proceeds.

The powdered or fluid-type catalytic hydrocarbon conversion system can employ a wide variety of catalysts, feeds charged, operating conditions, etc., for effecting alkylation, aromatization, dehydrogenation, desulfurization, gas reversion, hydrocarbon synthesis, hydroforming, hydrogenation, isoforming, isomerization, polymerization, reforming, etc. It is particularly applicable, however, to the catalytic cracking of hydrocarbon oil or hydroforming of naphthas for the production of high antiknock motor fuels and aviation gasolines and the invention will be described in reference thereto.

The invention will be more clearly understood from the following detailed description and from the accompanying drawing which forms a part of the specification.

Referring more particularly to the drawing, a topped crude is introduced into the system through line 10 being heated by means of heaters 11 on line 10 and the heated crude charged to crude fractionator 12. A light virgin gas oil fraction is removed overhead by line 13 and cooler 14 to gas separator 15. The separator 15 is vented via valved line 16. The light virgin gas oil is withdrawn from separator 15 by line 17 and introduced into a slurry tank or mixing device 18 where it is mixed with regenerated catalyst. In the embodiment illustrated, the tank 18 is provided with a stirring device 21 driven by motor 22. An orifice type mixer likewise can be used.

A light recycle gas oil but preferably light thermally cracked gas oil resulting from the thermal cracking of cycle gas oil from catalytic cracking is introduced into tank 18 by lines 19 and/or 20. The heavy gas oil from line 39 is a suitable stock for the thermal cracking.

The slurry of gas oil and regenerated catalyst is pumped by line 23 and pump 24 into a furnace coil 25 where the feed is vaporized in the presence of the catalyst. The vaporized oil, having a furnace outlet temperature within the range of between about 800° F. and about 1100° F. is then discharged into manifolded transfer line 26. The vapor and catalyst pass by this line into the reactor 27 at a point near its base. In the reaction zone the catalyst is maintained in a fluid dense phase. The oil is cracked to gasoline and gas and a coke deposit accumulates on the catalyst.

The reaction vapors and catalyst are separated by settling of the catalyst. Catalyst in the dilute phase in the enlarged portion of the reactor 27 is separated by suitable separators such as cyclone separators 28 and 29. The vapors and catalyst enter primary cyclone separator 28 by conduit 30, the recovered catalyst passing down dip leg 31 into the dense phase catalyst. Additional catalyst is recovered by secondary separator 29, the recovered catalyst being returned to the dense phase. If desired the dip legs 31 and 32 can be provided with suitable valve and aeration means (not shown). The substantially catalyst-free vapors pass via line 34 to product fractionator 35 where the last trace of catalyst is removed with the heavy bottoms via valved line 36 and the balance of the hydrocarbons is fractionated into a light gas oil, a heavy gas oil, gasoline and gas. Fractionator 35 is provided with reboiler and trapout 37.

The light gas oil is withdrawn as a side stream via line 19 and sent to slurry tank 18 as described above. A portion of the light gas oil can be withdrawn from the system by valved line 38 if desired.

If desired, a portion of the gas oil cut from fractionator 35, both light and heavy, can be recycled via line 19 to the slurry tank 18 for feeding to the reactor 27. The heavy gas oil can be withdrawn by line 39. This fraction, along with the light gas oil from valved line 38, if desired, can be thermally cracked and a light thermally cracked gas oil introduced by line 20 as hereinbefore described. The slurry of bottoms and catalyst produced in fractionator 35 is passed by valved line 36 and pump 40 through coil 41 of furnace 43 and into the transfer line 26 entering the reactor 27. Likewise all or a portion of the bottoms slurry can be sent by valved line 42, line 45 and cooler 44 to oil scrubber 46.

A heavy virgin gas oil recovered from crude fractionator 12 by valved line 47 can be passed through coil 48 of furnace 43 and into transfer line 26 introducing oil vapors and catalyst into the cracking zone 27. A drawoff 52 is provided on line 47. Preferably, however, all or a portion of the heavy virgin gas oil is sent by valved line 45 and pump 49 to oil scrubber 46 for catalyst recovery and passed with the recovered catalyst via line 19 to slurry tank 18 or via line 50 to furnace coil 48. Reduced crude is recovered by valved line 53 and can be preheated and injected into reactor 27 if desired. The catalyst and heavy virgin gas oil slurry in line 50 can be introduced into line 36 by line 50b and passed with the bottoms slurry from fractionator 35 to furnace coil 41 as described. Likewise light gas oil from separator 15 and heavy virgin gas oil from lines 47 and 54 can enter slurry tank 18 by line 17.

Catalysts adapted to my process are, for example, of the silica-alumina or silica-magnesia type. The catalyst can be prepared by the acid treating of natural clays, for example Super Filtrol such as bentonite or by synthetically preparing a powdered silica-alumina or silica-magnesia mixture. Such a mixture can be prepared by ball-milling silica hydrogel with alumina or magnesia, drying the resultant dough at a temperature of about 240° F. and then activating by heating to a temperature within the range of between about 900° F. and about 1000° F. The catalyst per se forms no part of the present invention and it is therefore unnecessary to describe it in further detail.

The vapor velocity within the reactor 27 is related to the particle size and density of the catalyst. When the catalyst is commercial acid-treated clay having a particle size of between about 1 and about 135 microns, I prefer to employ vapor velocities whereby the catalyst density in the reactor is of the order of 5 pounds per cubic foot or more, e. g. 15 pounds per cubic foot. Vapor velocities of the order of 0.5 feet to 4.0 feet per second, for example 1.5 feet second, can be used.

The density of the catalyst particles per se may be as high as 160 pounds per cubic foot, but the bulk density of the catalyst which has settled for five or ten minutes usually will be between about 35 and 60 pounds per cubic foot. With slight aeration, i. e. with vapor velocities of between about 0.05 and about 0.5 feet per second, the bulk density of 1 to 135 micron catalyst will be between about 20 and about 30 pounds per cubic foot. With vapor velocities of between about 1 and about 3 feet per second, the catalyst is in the dense turbulent dispersed catalyst phase and the bulk density of such catalyst may be between about 10 and about 20 pounds, for example about 15 to 18 pounds per cubic foot. With higher vapor velocities, i. e., the vapor velocities existing in transfer lines, the catalyst is in dilute dispersed phase, the density of which may be only about 1 or 2 pounds per cubic foot, or even less. Similarly the light dispersed catalyst phase in the top of the reactors or regenerators can have a density of between about 10 or 100 grains and about 3 pounds per cubic foot. The light dispersed catalyst phase is at least 5, and preferably is at least 12 pounds per cubic foot lighter than the dense turbulent dispersed catalyst phase.

There are a number of factors which primarily affect the extent of conversion in the reactor, they include the temperature, the quantity of catalyst in the reaction zone, the replacement rate, the intrinsic activity of the catalyst and the rate of oil introduction.

One manner of defining the conditions of the catalytic processing of hydrocarbons is in terms of space velocity and the catalyst-to-oil ratio within the reaction zone. I find it highly desirable to use a large amount of catalyst in the reactor. Thus for instance, excellent results are obtained by maintaining within said contacting zone between about five and about twenty times the weight of charging stock with which it is contacted. Higher catalyst-to-oil weight ratios within the range of 20 to 50, and even higher ratios, can be used. Having chosen a ratio of catalyst-to-oil within the reaction zone, I then find it highly desirable to use apparatus of such size operated under such conditions as to give a space velocity within the range of between about 0.1 and about 3 volumes of charging stock measured as liquid passing through the contacting zone per hour per apparent volume of catalyst present in the contacting zone. By apparent volume of the catalyst I refer to the gross catalyst space, i. e. the space which would be occupied by the catalyst within the contacting zone if the catalyst particles were at rest.

In general, the temperature range for the catalytic cracking process is between about 800° F. and about 1100° F. and preferably from about 875° F. to about 950° F. and with residual stocks preferably between about 940° F. and about 1000° F. The other factors can best be stated as follows:

An expression of the degree of severity of treatment at a given temperature and with a particular catalyst can be expressed as the product of a function of average catalyst residence time in minutes, the residence time being the average length of time the catalyst is held within the reaction zone, and of the "weight space velocity" which is defined as the weight of oil feed per hour divided by the weight of catalyst in the reaction zone. Thus:

$$b = (\text{weight space velocity}) \times (\text{catalyst residence time})^{.534}$$

where $b$ is a factor greater than 1.2, preferably between 4 and 16, weight space velocity is as defined above, catalyst residence time is expressed in minutes, and .534 is an exponent affecting only the catalyst residence time. The smaller the value of $b$, the more severe the treatment. I have found that the range in which satisfactory cracking will be obtained is when $b$ has a value within the range of between about 48, where low conversions are obtained, and about 1.2, where incipient over-cracking usually will be encountered. In the case of most catalysts, operation will be found best in my preferred range of severity where $b$ has a value of between about 16 and about 4.

To illustrate my invention using Super Filtrol powder, an acid-treated clay, as the catalyst at about 925° F. the following two sets of conditions will both give about 45% gasoline from Mid-Continent gas oil:

|  | I | II |
| --- | --- | --- |
| Weight space velocity | 0.6 hrs.$^{-1}$ | 0.2 hrs.$^{-1}$ |
| Catalyst residence time | 130.0 minutes | 1000.0 minutes. |
| Value of $b$ | 8.0 | 8.0. |

I prefer not to exceed a regenerated catalyst-to-oil feed ratio of about 1.0 fed to the reactor, a preferred ratio being about 0.5. An example of a typical operation is:

III

| | |
| --- | --- |
| Feed | Mid-Continent gas oil |
| Catalyst - to - oil weight ratio fed to reaction zone | 0.5. |
| Average reactor pressure | 20 lbs.per sq. in. gauge. |
| Temperature | About 925° F. |
| Upward linear velocity of vapors in reactor | 1.5 ft./sec. |
| Weight space velocity | 0.35 hrs.$^{-1}$ |
| Catalyst residence time | 350 minutes. |
| Value of $b$ | 8.0. |

In my process the pressure in the reactor at any one level will be at least 1.0 pounds per square inch higher than in the regenerator at the same level so that positive flow of dense aerated catalyst from the reactor to the regenerator is possible. Thus in my system there is only one device for furnishing the energy necessary for catalyst circuit flow of regenerator to reactor and back to the regenerator, namely a slurry pump.

The spent catalyst is withdrawn from reactor 27 by one or more overflow pipes or stripping zones 55 wherein the catalyst accumulates in a dense aerated phase. If desired the pipe 55 can be extended to a point near the top of the turbulent phase catalyst. Steam can be introduced into stripper 55 by line 56 and into transfer line 57 by line 58 whereby the oil vapors are removed by an upwardly flowing blanket of steam. The stripped catalyst flows into the regenerator through transfer line 57 containing check valve 59 which prevents reverse flow. Regeneration air is introduced near the base of the regeneration zone 60 via line 61 and near the end of transfer line 57 by line 62. The regeneration zone also is operated under low velocity conditions whereby a dense phase is formed in the regenerator 60. The regenerator 60 can have an enlarged top section to facilitate the settling of catalyst particles out of the upper dilute catalyst phase. Cyclone separators 63 and 64 knock back the catalyst recovered from the regeneration gas and the catalyst passes by dip legs or standpipes 65 and 66 into the dense phase. Upward linear velocities required to maintain the dense turbulent phase in the regenerator 60 are of the same order of magnitude as those for the reactor 27.

An operating pressure within the range of eight pounds per square inch and about twenty pounds per square inch can be used. A temperature of between about 900° F. and about 1050° F. or higher, for example about 1000° F., is maintained.

When more heat is liberated in the regenerator 60 than safely can be stored in the catalyst without exceeding the upper desired temperature limits of between about 1000° F. and 1050° F., or higher, for example 1300° F. with certain catalysts, it is necessary to provide means for removing heat from the regenerator 60. The regenerator can be cooled in a variety of ways. The manner diagrammatically illustrated is that of installing boiler tubes 67 around the periphery but inside the regenerator 60. Details are not shown since this means of temperature control forms no part of the present invention. Other means include, for example, withdrawing catalyst in the dense phase, cooling the catalyst while maintaining dense phase, and returning dense phase catalyst to the regenerator.

The regenerated catalyst is removed by overflow pipe and stripper 68 extending through the base of the regenerator 60. In this stripper 68 regenerated catalyst flows downwardly against an upwardly flowing blanket of steam introduced by line 69 whereby oxygen is stripped from the catalyst, the catalyst being introduced into slurry tank 18 by control valve 70 and routed as described herein.

The hot regeneration gases removed overhead by line 71 may be at a temperature within the range from about 1000° F. to about 1050° F. or higher and they may contain recoverable amounts of catalyst. Flue gases pass through the cyclones 63 and 64 and are cooled, the last traces of catalyst being recovered, for example either by an electrical precipitator (not shown) and the catalyst returned to the slurry mixing tank 18 or the gases scrubbed in scrubber 46 with the heavy virgin gas oil and the slurry passed through the furnace 43 as described.

In the embodiment illustrated in the drawing, these hot regeneration gases are passed through heat exchangers or coolers 72 and 73. The gases in line 71 leading to scrubber 46 are at a temperature not higher than about 700° F. after passing through coolers 72 and 73, and preferably are cooled to a temperature within the range of between about 500° F. and about 600° F. The cooled gases together with the catalyst particles suspended therein are introduced into the scrubber 46 near its base.

A scrubber oil is introduced through line 45 at a point near the top of the scrubbing tower 46. If a plurality of scrubber oils are available the stock with the lowest vapor pressure should be charged through line 45 into the scrubber. The heavy virgin gas oil from crude fractionator 12 is a suitable scrubbing oil. This scrubbing tower is provided with suitable baffles 75 or, preferably, it is provided with conventional bubble plates. With the scrubber oil introduced at a temperature of about 100° F. through line 45 and with regeneration gases entering the scrubber through line 71 at a temperature of about 600° F. the bottom of the scrubber operates at about 400° F. and the top at about 100° F. Since the regeneration gases contain considerable amounts of steam, there will be a condensation of this steam at some intermediate point within the scrubber 46, the point being that at which the temperature corresponds to the dew point of the steam in the regeneration gases. At this point I provide a liquid trapout plate 76 and I withdraw liquids from this plate through line 77 to enlarged settling drum 78. The condensed water is drawn off at the base of this drum 78 through line 79 and oil is withdrawn from the top of the settling drum through drawoff line 80 and reintroduced into the scrubber tower 46.

The cold regeneration gas leaves at the top of the scrubber 46 through line 81. This gas has been denuded of catalyst and the heat of the regeneration gas has been utilized to preheat the cycled stock. The amount of hydrocarbon vapors which is lost from the system with the cold regeneration gas is negligible compared to the savings in catalyst cost and efficient treatment of the cycled stocks.

The overhead from product fractionator 35 passes by line 82 through cooler 83 and into separator 84. The gasoline fraction is withdrawn as bottoms from separator 84 by valved line 85 and pump 86 and passed in heat exchange by means of 87 with product bottoms from rectifier 88 before entering the rectifier. The stabilized gasoline is withdrawn as bottoms from the rectifier 88 by means of valved line 89. Coils 90 and 91 can be provided to supply heating for rectification and cooling for reflux, respectively. The normally gaseous hydrocarbons withdrawn as the overhead from separator 84 by line 92 and from rectifier 88 by valved line 93 can be recovered by conventional means not shown.

In another modification of my process I can mix naphthas with catalysts to produce a slurry which is heated in a furnace to elevated temperatures, the mixture of catalyst and vaporized and superheated naphtha passing to a reactor. The catalyst is retained in the reactor for a prolonged period as described below, the conversion products are cooled and passed through separation equipment. The catalyst is transferred from the reactor to a lower pressure regenerator and after regeneration is mixed with naphtha and repeats the cycle described above. Hydrogen, or gases rich in hydrogen derived from the process, is preheated and passed through the reaction zone in admixture with naphtha, the gases separated in the subsequent separating equipment, the net hydrogen eliminated and the balance recycled.

The catalyst used is a powdered solid composed of oxides of group V or VI metals on alumina or equivalent support, for example molybdenum, chromium or vanadium oxides on "activated alumina" base.

In general, the conditions for processing naphtha with these catalysts include a temperature of between about 850° F. and about 1025° F.; a pressure of between about 30 and about 450 pounds per square inch; a mol of hydrogen to mol of feed ratio of between about 0.5 and about 10; a catalyst residence time of between about 120 and about 1200 minutes; a regenerated catalyst-to-naphtha feed weight ratio of less than 1; and a weight space velocity of between about 0.1 and about 3 hours $^{-1}$.

To illustrate my invention using one of the catalysts described above the following conditions are set forth:

IV

| | |
|---|---|
| Catalyst to naphtha feed wt. ratio | .24 |
| Mols hydrogen/mol feed | 3.0 |
| Average reactor pressure____lbs. per sq. in | 200 |
| Temperature _____°F | 960 |
| Weight space velocity_____hrs. $^{-1}$ | 0.7 |
| Catalyst residence time_____min | 360 |

This process involves dehydrogenation and cyclization of paraffins and dehydrogenation of naphthenes as the predominant reactions. Under the example condition mentioned above, East Texas heavy naphtha will be converted to a product of about 80 ASTM octane number with a yield of about 80 volume per cent yield. The product will contain from 5–15% toluene dependent on the exact distillation of the feed. Both light and heavy naphtha prepared by hydrocarbon synthesis in accordance with the Fischer or Fischer-Tropsch process may be converted to high octane number under these conditions by my process.

From the above description it will be seen that I have provided a unique process wherein a slurry of catalyst and feed is heated to vaporize the charge and the vapor plus catalyst introduced into a powdered catalyst contacting zone wherein the reaction vapors are removed overhead and the spent catalyst is withdrawn from a point in the dense phase. Long catalyst residence time, high catalyst-to-oil ratios in the reactor, and low regenerated catalyst-to-charge ratio are particular features of the invention.

While I have described my process and apparatus in terms of illustrative embodiments thereof, it should be understood that I do not intend to be limited except by the following claims:

I claim:

1. The process of catalytically cracking hydrocarbons comprising fractionating topped crude to produce a light virgin gas oil, a heavy virgin gas oil, and reduced crude, slurrying said light virgin gas oil in the liquid phase with powdered catalyst, heating said slurry to vaporize said light virgin gas oil, introducing the vapors and catalyst into a reaction zone, maintaining a substantial body of catalyst within said reaction zone in a dense turbulent phase, continuously passing hydrocarbon vapors through the said dense turbulent phase, withdrawing the reaction products from said reaction zone, fractionating said reaction products to recover a light catalytically cracked gas oil and a bottoms slurry of catalyst, withdrawing spent catalyst from the dense turbulent phase of said reaction zone, introducing said spent catalyst into a regeneration zone, introducing oxygen-containing gases into said regeneration zone, maintaining a substantial body of catalyst within said zone in a dense turbulent phase, withdrawing regeneration gases from said regeneration zone, scrubbing said gases with the said heavy virgin gas oil to produce a slurry of catalyst in gas oil, combining additional liquid gas oil with said slurry, vaporizing said gas oils in the presence of the recovered catalyst, introducing said vaporized stream into said reaction zone, withdrawing regenerated catalyst from the dense turbulent phase of said regeneration zone, stripping said catalyst with steam, slurrying said catalyst with said light catalytically cracked gas oil, heating said catalytically cracked gas oil in the presence of said catalyst, and introducing the heated stream into said reaction zone.

2. The process of catalytically cracking hydrocarbons which comprises heating a combined slurry of regenerated catalyst in an admixture of liquid gas oil charging stocks to a temperature sufficient to effect vaporization of said charging stocks whereby a suspension of catalyst in hot hydrocarbon vapors is obtained, introducing said suspension into a reaction zone of large cross-sectional area, passing vapors upwardly through said reaction zone at a velocity to maintain the catalyst in dense turbulent phase and under conditions for effecting catalytic cracking, withdrawing reaction products from a space in the reaction zone above said dense turbulent phase, fractionating said reaction products to recover catalytically cracked products and a bottoms fraction containing catalyst, downwardly withdrawing spent catalyst from the dense turbulent phase in the reaction zone as a separate stream from the withdrawn reaction products, introducing said spent catalyst into a regeneration zone, introducing oxygen-containing gases into said regeneration zone and passing said gases upwardly therein at a rate to maintain a dense turbulent catalyst phase in the regeneration zone, withdrawing regeneration gases from a portion of the regeneration zone above the dense turbulent phase, scrubbing said withdrawn gases with a gas oil charging stock to recover regenerated catalyst and form a slurry thereof, withdrawing hot regenerated catalyst directly from the dense phase in the regeneration zone separately from regeneration gases, combining with said slurry and added gas oil said withdrawn regenerated catalyst to form a combined slurry, pumping said combined slurry to said heating step to complete the catalyst cycle and returning catalyst from said bottom fraction to said catalyst cycle.

3. The process of catalytically cracking hydrocarbons comprising fractionating topped crude to produce a light virgin gas oil, a heavy virgin gas oil, and reduced crude, slurrying powdered catalyst, at least in part, with said light virgin gas oil in the liquid phase, heating said slurry to vaporize said light virgin gas oil, introducing the vapors and catalyst into a reaction zone, maintaining a substantial body of catalyst within said reaction zone in a dense turbulent phase, continuously passing hydrocarbon vapors through said dense turbulent phase, withdrawing the reaction products from said reaction zone, fractionating said reaction products to recover a light catalytically cracked gas oil and a bottoms slurry of catalyst, withdrawing spent catalyst from the dense turbulent phase of said reaction zone, introducing said spent catalyst into a regeneration zone, introducing oxygen-containing gases into said regeneration zone, maintaining a substantial body of catalyst within said zone in a dense turbulent phase, withdrawing regenerated catalyst from the dense turbulent phase of said regeneration zone, slurrying said catalyst with a gas oil fraction, withdrawing regeneration gases from said regeneration zone, scrubbing said gases with a heavy gas oil to produce a slurry of catalyst, combining additional liquid gas oil with said slurry, vaporizing said gas oils in the presence of the slurried catalyst and introducing said vaporized gas oils into said reaction zone.

MAURICE H. ARVESON.